(12) United States Patent
Melchior

(10) Patent No.: US 7,730,866 B2
(45) Date of Patent: Jun. 8, 2010

(54) SEALING DEVICE

(76) Inventor: Jean Frederic Melchior, 16, rue de l'Abbaye, 75006 Paris (FR)

(*) Notice: Subject to any disclaimer, the term of this patent is extended or adjusted under 35 U.S.C. 154(b) by 513 days.

(21) Appl. No.: 11/621,818

(22) Filed: Jan. 10, 2007

(65) Prior Publication Data

US 2007/0296154 A1    Dec. 27, 2007

Related U.S. Application Data

(63) Continuation-in-part of application No. 11/566,369, filed on Dec. 4, 2006, now abandoned.

(60) Provisional application No. 60/742,880, filed on Dec. 7, 2005.

(30) Foreign Application Priority Data

Dec. 5, 2005  (FR) ................................. 05 12314

(51) Int. Cl.
   *F01B 31/10* (2006.01)
(52) U.S. Cl. .................................. 123/193.6; 277/434
(58) Field of Classification Search ......... 277/434–499; 123/193.6; 92/193

See application file for complete search history.

(56) References Cited

U.S. PATENT DOCUMENTS

| | | | |
|---|---|---|---|
| 2,591,230 A | 4/1952 | Bertrand | |
| 2,860,936 A | 11/1958 | Habenicht | |
| 3,656,766 A * | 4/1972 | Geffroy | 277/451 |
| 4,129,108 A * | 12/1978 | Elsbett et al. | 123/193.6 |
| 4,452,464 A * | 6/1984 | Furuhama | 277/457 |
| 4,629,200 A * | 12/1986 | Ruddy | 277/463 |
| 4,669,369 A * | 6/1987 | Holt et al. | 92/160 |
| 4,794,848 A | 1/1989 | Melchior | |
| 5,172,921 A | 12/1992 | Stenlund | |
| 5,618,046 A * | 4/1997 | Binford | 277/464 |
| 6,615,788 B2 * | 9/2003 | Han | 123/193.6 |
| 7,140,291 B2 * | 11/2006 | Dunaevsky et al. | 92/253 |

FOREIGN PATENT DOCUMENTS

FR    2 702 024    9/1994

* cited by examiner

*Primary Examiner*—M. McMahon
(74) *Attorney, Agent, or Firm*—Stites & Harbison PLLC; Douglas E. Jackson

(57) ABSTRACT

This device is designed for a piston which is designed to move in alternating linear movement parallel to the axis of a chamber divided by the piston into a high pressure volume and a low pressure volume, and is of the type comprising:
   a circular cylindrical sliding surface bounding the chamber,
   an annular groove provided in the piston which is coaxial with the sliding surface and open towards the sliding surface, and
   a closed resilient sealing ring housed in a leak tight manner in the groove and intended to make sealing contact with the sliding surface.

According to one aspect of the invention the ring is designed to determine the size of a lubricating oil film between the ring and the sliding surface to a limit lubricating thickness preferably from 0.1 μm to 1 μm when it moves from the high pressure volume to the low pressure volume.

31 Claims, 8 Drawing Sheets

SEALING DEVICE

CROSS-REFERENCE TO RELATED APPLICATIONS

This application is a continuation-in-part of application Ser. No. 11/566,369, filed on Dec. 4, 2006; which claims benefit of U.S. Provisional Application No. 60/742,880, filed on Dec. 7, 2005 (both of which are hereby incorporated by reference).

FIELD OF THE INVENTION

This invention relates to a sealing device for a piston designed to move in alternating linear motion parallel to one direction in a chamber divided by the piston into a high pressure volume and a low pressure volume, of the type comprising:
- a circular cylindrical sliding surface having an axis parallel to the direction of movement of the piston,
- an annular groove coaxial with the sliding surface, which opens towards the sliding surface,
- one of the sliding surface and the groove being of one piece with the piston and the other with the chamber, and
- a resilient closed sealing ring housed in a leak tight manner in the groove, and in sealing contact with the sliding surface through a sealing bearing surface whose perimeter in the free state is slightly greater than the perimeter of the integral sliding surface of the chamber or slightly less than the perimeter of the integral sliding surface of the piston so that the sliding surface imposes permanent resilient compression or tension deformation on the ring which brings about a substantially uniform bearing pressure between the bearing surface and the sliding surface when the ring is resiliently tightly held against the latter.

DESCRIPTION OF THE PRIOR ART

Many machines use pistons, each in alternating linear movement within a chamber, bounded by a wall, to separate the chamber into two volumes filled with fluids at different pressures. Mention will be made, by way of indication and without restriction, of internal combustion engines and alternating compressors.

In order to withstand pressure and wear forces the chamber wall and the piston are generally of metal.

The chamber wall and the piston experience differential expansion according to their corresponding temperatures. Furthermore, the stresses due to the pressure of the fluids generate elastic deformations in the wall of the chamber and the piston. These deformations are capable of causing leaks to appear between the piston and the wall.

In order to limit the leaks one arrangement comprises placing a deformable seal which absorbs variations in play between the chamber wall and the piston when in operation.

In alternating engines one arrangement consists of using a split (or open) metal seal or "sealing ring" held in a groove in the piston, and bearing resiliently upon the sliding surface of the wall chamber, generally known as the "cylinder" in alternating engines.

Self-sealing resulting from the pressure of the gases in the high pressure volume of the cylinder in which combustion of the gases takes place is brought about partly by the sealing ring bearing on one surface located on the low pressure volume side of the piston groove and by the sealing ring bearing against the sliding surface of the cylinder.

However the seal obtained in this way is unsatisfactory. As a result a flow of burnt gases passes from the high pressure volume, where combustion takes place in alternating engines, towards the low pressure volume, in communication with a crankcase of the engine providing a reservoir of lubricating oil, which pollutes the lubricating oil. This flow also heats the sliding surface and the piston, and deposits abrasive particles on the surfaces rubbing together. In addition to this, this flow of gas, which carries over lubricating oil vapour present in the crankcase, has to be drawn in again by the engine which then emits particles of burnt oil.

The following disadvantages result:
- consumption and pollution of the lubricating oil, which renders periodical changing necessary,
- wear of the lubricated members and increased friction losses,
- atmospheric pollution through the passage of oil vapours into the high pressure volume, and combustion of these oil vapours, and
- poisoning of catalysts and clogging of particulate filters by the additives present in the burnt oil vapours.

The split in the sealing ring is partly responsible for the lack of seal.

This sealing defect is also due to the fact that the sliding seal between the sealing ring and the sliding surface is insufficient.

In fact there is radial play between the bearing surface of the sealing ring and the sliding surface. This play is due to the radial rigidity of the split sealing ring, which is necessary in order to keep the sealing ring bearing resiliently on the sliding surface in the absence of gas pressure. This rigidity prevents the sealing ring from adapting its shape to the geometry of the sliding surface. Leak tight areas are limited to sectors of the circumference of the sealing ring bearing upon the sliding surface. The rest of the sealing ring circumference allows the passage of gas, which heats and pollutes the sliding surface at the risk of causing dry friction between the areas in contact.

In order to prevent sticking through dry friction, one solution is to create helical oil-holding striations on the sliding surface, preferably made of cast iron, the carbon of which acts as a solid lubricant.

Document FR 2 602 827 describes an unsplit (closed) flexible sealing ring mounted with a tight fit on the sliding surface on a cylinder of an alternating engine. This ring is designed to generate a thick film of oil of hydrodynamic bearing capacity on the sliding surface when the piston moves.

However this ring has proved to be of little effect in controlling oil consumption, and has the disadvantage that it draws in abrasive particles which degrade the surfaces in contact.

SUMMARY OF THE INVENTION

The object of this invention is to provide a sealing device between a piston and the wall of a chamber which provides an improved seal while permitting sufficient lubrication to prevent wear.

For this purpose the invention provides a sealing device of the aforesaid type, wherein the ring is fitted in the groove in such a way as to prevent axial deformation of the ring and to allow free radial movement of the ring in the groove.

Thus it is possible to place a sealing ring of small meridian cross-section under resilient compression, which imparts great flexibility upon it in all directions. The sealing ring thus matches the sliding surface to ensure an almost perfect seal. Axial deformation of the sealing ring which would cancel out the compression stress of the ring is prevented by the groove in which the ring is fitted in such a way that it cannot deform axially.

The geometry of the sealing ring thus matches that of the sliding surface with a substantially constant contact pressure over the entire periphery. This pressure depends on how tightly the sealing ring bears on the sliding surface, its meridian cross-section and the extent of the sealing bearing surface. If deformation of the sliding surface (ovalisation) which may occur in operation does not change the contact perimeter between the sliding surface and the sealing bearing surface, the specific pressure and the stress in the sealing ring are constant over the entire travel of the piston. If the perimeter of the sliding surface varies over the piston travel, the variation must be sufficiently small for the sealing ring to operate within its fatigue limits, with a minimum contact pressure sufficient to ensure a seal.

Preferably lubricating oil feed means are provided to feed lubricating oil to the entire periphery of the sealing ring on the side located in the low pressure volume, and the sealing ring is designed to determine the size of a limiting film of lubricating oil of very small thickness, a fraction of a micrometer, during its travel towards the low pressure volume. The film thickness is preferably from 0.1 to 1 micrometer, and preferably from 0.1 to 0.5 micrometers.

The size of this film is determined and the film is deposited by the sealing ring on the part of the sliding surface located in the high pressure volume as the piston moves from the high pressure volume to the low pressure volume. The film thickness is just sufficient for the sealing ring to slide on the film without direct contact with the sliding surface while the piston moves towards the high pressure volume and insufficient for the ring to push oil towards the high pressure volume.

The sliding surface holds the oil layer by the powerful physical and chemical forces of limit lubrication. It would be advantageous to treat the surface to improve film adhesion.

The sliding surface is preferably hard and polished so that surface relief is less than the thickness of the lubricating oil film. The sliding surface is for example made of nitrided steel.

In a self-sealing sealing ring assembly the pressure of the gases adds to the pressure resulting from tightening the sealing ring onto the sliding surface (or "resilient pressure") so that the sealing ring bears on the sliding surface.

The optimum resilient pressure depends on the nature of the materials of the sliding surface and the sealing ring, the lubricant, and the condition of the surfaces. Preferably the resilient pressure lies from 20 to 100 bars.

The thickness of the oil film diminishes with the contact pressure of the sealing ring against the sliding surface. A self-sealing assembly of the sealing ring results in the formation of a film whose thickness decreases between the low pressure part of the sliding surface and the high pressure part of the sliding surface.

In order to reduce oil consumption to a minimum, a resilient pressure sufficient to stem the maximum pressure achieved in the high pressure volume during operation may be chosen, and a non-self-sealing assembly may be constructed. This contact pressure, which determines the film thickness, depends on the pressure which has to be sealed off, and no longer depends on the position of the piston.

A cylindrical sealing bearing surface connected by sharp angles to flat scraping surfaces allows the sealing ring to push abrasive particles of dimensions greater than the film thickness back towards the high pressure volume (for example the combustion chamber of an alternating engine) and to scrape oil towards the low pressure volume (towards the engine's crankcase).

The sharp angle of the sealing ring on the high pressure volume side nevertheless risks scraping part of the film towards the high pressure volume, which in this case accumulates on the part of the sealing ring exposed to the high pressure volume. A small tapering surface (summit angle approximately 2 degrees) or cambered surface extending the sealing surface as far as the sharp angle on the high pressure side (some tenths of a millimeter) makes it possible to prevent oil from rising up, and to push back abrasive particles.

When the sliding surface is integral with the chamber, in order to obtain good geometric conformability and limit tightening tolerances the sealing ring must be caused to work under the greatest compression stress compatible with its fatigue and buckling limits.

Axial buckling is prevented by the groove which prevents axial deformation of the ring. Outward radial buckling is prevented by bearing on the sliding surface. The inward radial buckling limit is pushed back by the radius of curvature imposed on the sealing ring by the sliding surface.

In order to prevent inward radial resilient buckling of the ring an annular joint of elastomer material can be placed between the sealing ring and the base of the groove. The seal pushes back the buckling limit while ensuring a static seal between the sealing ring and the piston. The seal-forming bearing force of the sealing ring on the low pressure side of the groove prevents creep of the elastomer. The presence of incompressible oil around the annular seal limits cyclic deformation which might deform the seal through heating. A seal of appropriate profile could also fill the angle between one surface of the sealing ring and the bottom of the groove and a bearing surface on the low pressure side of the groove, against which the sealing ring bears. The incompressible elastomer seal will then follow small radial slips of the sealing ring without deforming.

Advantageously, a piston according to the invention is provided with a single sealing ring.

In order to function properly the sealing ring must be capable of moving parallel to the axis of the sliding surface without tilting or torsion. Furthermore radial movements of the sealing ring within the groove must be as small as possible. The distance between the edge of the groove's bearing surface, located on the low pressure side, against which the sealing ring bears, and the sliding surface must also be a minimum. For all these reasons the play in guiding the piston in the cylinder must be minimal, by choosing an expansion coefficient for the piston which is close to that of the cylinder and by limiting the temperature difference between the guided part of the piston and the cylinder.

In order to achieve this the invention envisages that the head of the hot piston, which incorporates a combustion recess, made of highly heat-conducting light alloy, must be separate from the cold piston body which carries a guiding skirt of steel or cast iron.

The improved seal of the piston makes it possible for a mass of gas which is not renewed to be retained in the space between the sliding surface and the piston on the side of the sealing ring which is exposed to the high pressure volume. When in operation this mass of gas exchanges heat with the sliding surface until its mean temperature equals that of the latter. The sealing ring according to the invention thus ensures satisfactory thermal protection of the piston body and the sliding surface, which should make it possible to eliminate water cooling outside the chamber and replace it by oil cooling of the sliding surface and the piston body. This cooling could be provided by a ring of oil in contact with the sliding surface and driven by the piston to increase the thermal exchange coefficient and render the temperature of the sliding surface uniform.

The piston advantageously comprises two annular guide shoes of small radial thickness (1% to 3% of the diameter of the sliding surface), spaced axially, and whose profile encourages the formation of a hydrodynamic oil wedge as a result of reduced operating play and tapering oil inlets. The cooling oil ring can then be located between the guide shoes and feed the oil film. The oil film can be fed by a jet of fresh oil to cool the sliding surface and the piston body, and drain against the surface of the piston head to cool the combustion chamber.

Thus, in accordance with other embodiments the sealing device comprises one or more of the following features taken in isolation or in all technically possible combinations:

- the groove is bounded axially by two contact surfaces with the ring, of planar general shape, perpendicular to the axis of the sliding surface, the axial distance between the two contact surfaces being just sufficient to prevent axial deformation of the ring, and to allow radial movement of the ring within the groove,
- the radial thickness of the ring lies from 2% to 5% of the diameter of the sliding surface which is integral with the chamber,
- the ratio of the difference between the perimeter of the bearing surface of the ring in the free condition and the perimeter of the sliding surface to the perimeter of the sliding surface lies from 1/1000 to 4/1000,
- the ring is designed to determine the size of a lubricating oil film between the ring and the sliding surface to a limiting lubrication thickness of preferably from 0.1 µm to 0.5 µm,
- the device comprises means to deliver lubricating oil to the entire periphery of one edge of the bearing surface of the ring located on the side of the low pressure volume,
- the bearing surface of the ring is cylindrical,
- the axial dimension of the bearing surface of the ring is from 0.5 to 5 millimeters,
- the ratio between the axial dimension of the bearing surface of the ring and the diameter of the sliding surface is from 1/100 to 3/100,
- the ring comprises a surface scraping the layer of oil covering the part of the sliding surface located in the low pressure volume, this surface joining the bearing surface of the ring forming a sharp edge on the low pressure side limiting the bearing surface on the low pressure volume side with a low pressure side angle of from 45 to 90° to the said axis in such a way as to leave a limit lubricating oil film having a thickness of a fraction of a micrometer on the part of the sliding surface located in the high pressure volume,
- the sliding surface is polished to eliminate any relief which is greater than the thickness of the limit lubricating oil film,
- the bearing surface of the ring is extended on the high pressure volume side by a section which progressively separates from the sliding surface as far as a sharp edge on the high pressure side bounding the section on the high pressure volume side formed with a surface of the particle scraping ring, the said sharp angle being a fraction of a micrometer distant from the sliding surface,
- the ring comprises a surface of planar general shape perpendicular to the axis of the sliding surface, in contact with the surface of planar general shape of the groove located on the low pressure volume side,
- the device comprises an annular seal of elastomer material in permanent contact with the base of the groove, with the surface of the ring facing the base of the groove, and with a surface of planar general shape of the groove located on the low pressure volume side,
- it comprises an annular seal of elastomer material, integral with the ring, which occupies the whole of the angle formed by the surface of the ring against the base of the groove and the surface of planar general shape of the groove located on the low pressure volume side,
- it comprises an auxiliary resilient ring held in leak tight contact with a planar sealing face of the sealing ring perpendicular to the axis of the sliding surface located on the high pressure volume side because of the fact that it bears tightly against a sealing surface of the substantially tapering groove which opens towards the high pressure volume,
- the auxiliary ring is in contact with the sealing ring in a plane perpendicular to the axis of the sliding surface located in the plane of or on the low pressure side of an edge of the bearing surface of the sealing ring located on the high pressure volume side.

The invention also relates to an assembly for an alternating engine or compressor comprising at least one chamber, a piston designed to move in alternating linear movement parallel to one direction within the chamber and dividing the chamber into a high pressure volume and a low pressure volume, the assembly comprising a sealing device as defined above.

In one embodiment the piston bounds an annular space within the high pressure volume located radially between the piston and the sliding surface and axially between the sealing ring and the axial extremity of the piston, the said space having sufficient volume for a mass of gas present in the said space at a minimum pressure of the cycle in the high pressure volume to occupy sufficient volume to wholly immerse the part of the sealing ring exposed to the high pressure when the said mass of gas is compressed at the maximum pressure of the cycle in the high pressure volume.

In one embodiment the piston comprises at least one annular closed guide ring bounding together with the sealing ring axially and with the sliding surface radially a closed annular space communicating with the fresh oil feed means and discharging into a piston cooling circuit opening into the low pressure volume.

In one embodiment the sliding surface is only cooled by a quantity of fresh oil carried by the piston into the space formed between the shoe and the sealing ring.

BRIEF DESCRIPTION OF THE DRAWINGS

The invention and its advantages will be better understood from a reading of the following description, provided only by way of example, and with reference to the appended drawings in which.

DETAILED DESCRIPTION OF THE PREFERRED EMBODIMENTS

Figure 1:
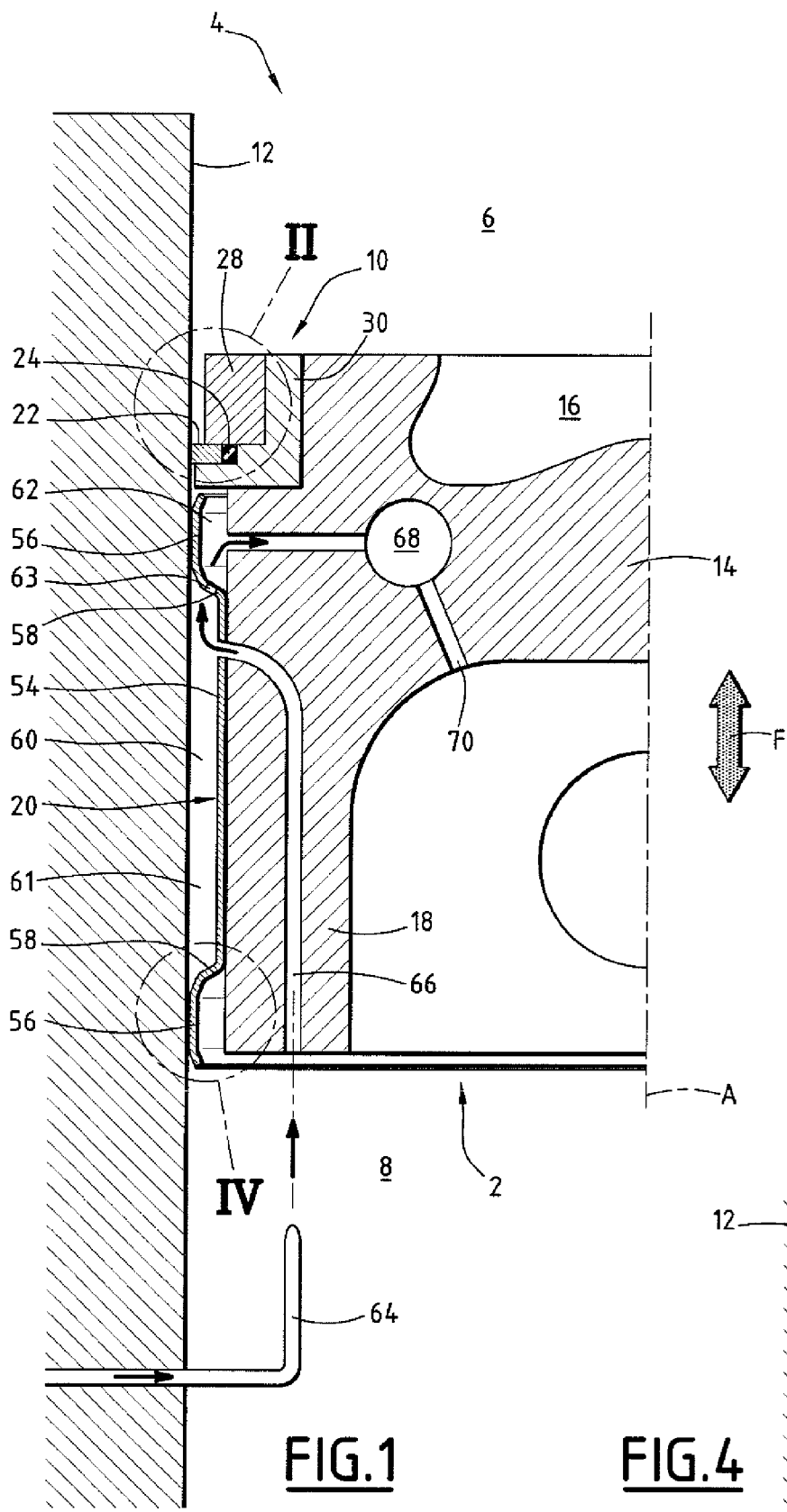
FIG. 1 is a diagrammatical view in axial half cross-section of a piston of an internal combustion engine having a sealing device according to the invention located between the piston and a chamber within which the piston moves.

As illustrated in FIG. 1, piston 2 is movably mounted within chamber 4 of the internal combustion engine, moving in alternating linear motion (Arrow F) along an axis A.

Piston 2 separates chamber 4 in a leak tight manner into an upper high pressure volume 6 designed to receive air and fuel with a view to combustion, in a manner which is in itself known, and a lower low pressure volume 8 designed to be in communication with a crankcase containing a reserve of engine lubricating oil.

A sealing device 10 is located between piston 2 and sliding surface 12 partly bounding chamber 4. Surface 12 is circular and cylindrical and has an axis A.

Piston 2 comprises a body 14 in which there is a combustion recess 16 opening towards volume 6, a skirt 18 extending axially from body 14 towards volume 8, and a tubular jacket 20 guiding piston 2 along surface 12, integral with the external surface of skirt 18.

Figure 2:
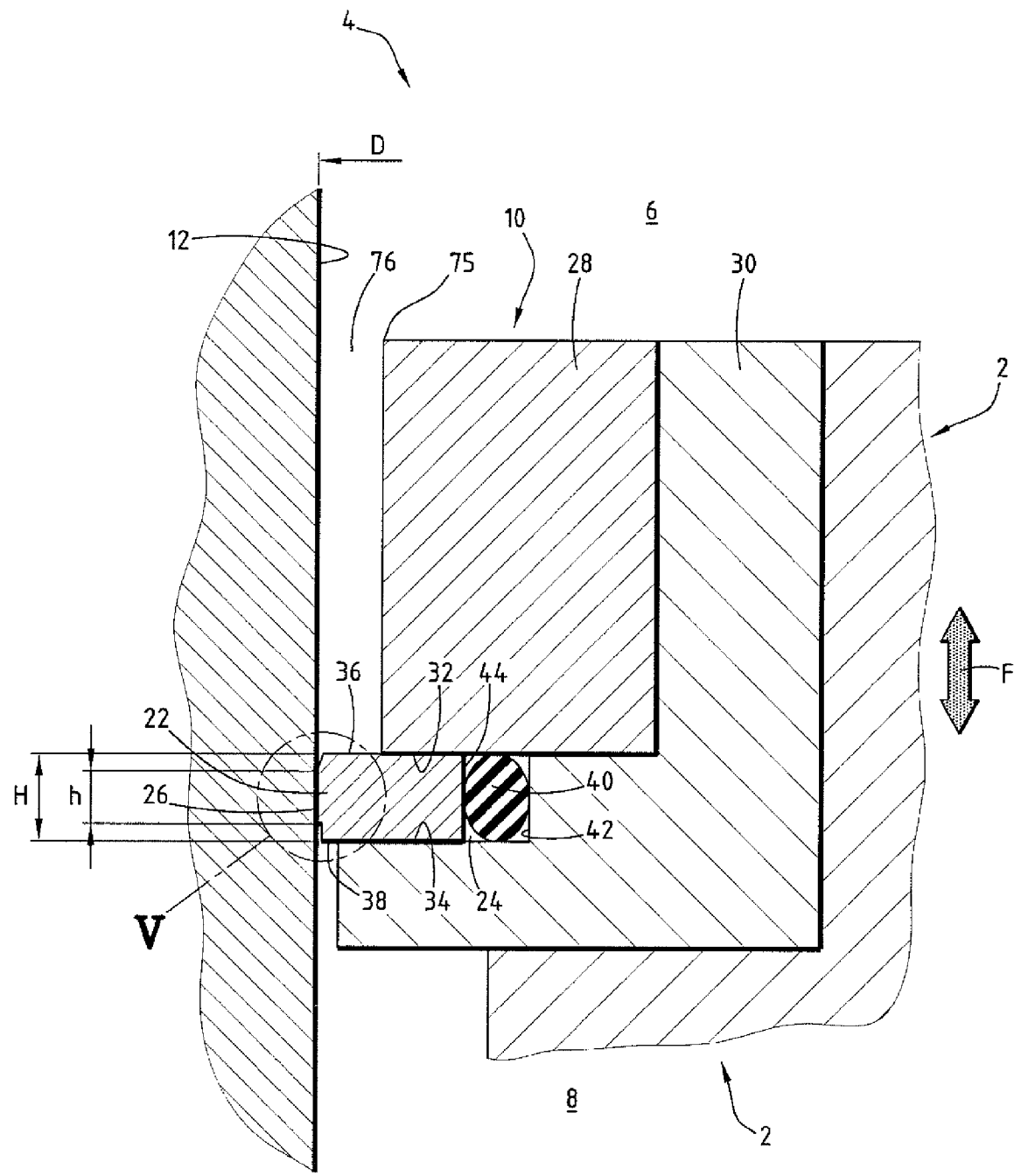
FIG. 2 is an enlarged view of area II in FIG. 1.

As illustrated in FIG. 2, sealing device 10 comprises a metal sealing ring 22 which is separate from piston 2 and chamber 4, and fitted in a groove 24 integral with piston 2, opening towards surface 12. Ring 22 moves with piston 2, and bears against surface 12 through a cylindrical bearing surface 26 of axis A.

Ring 22 is received in a leak tight manner within groove 24, and as piston 2 moves (Arrow F) bearing surface 26 is in leak tight contact with surface 12 and slides therealong.

Figure 3:
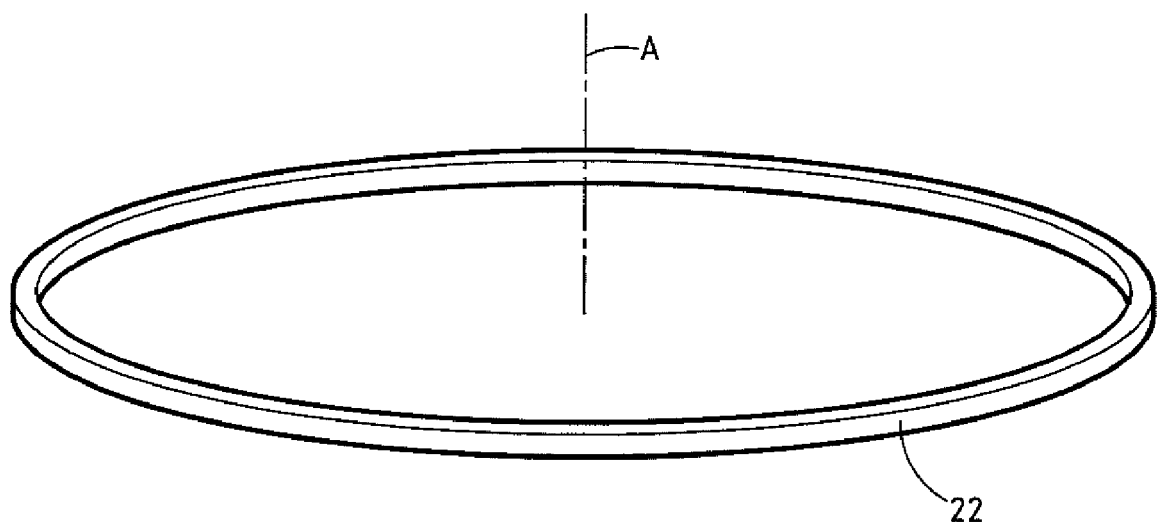
FIG. 3 is a diagrammatical perspective view of a sealing ring of the sealing device in FIG. 1.

As illustrated in FIG. 3, ring 22 is closed, that is to say it is continuous over its circumference, and it is not cut or split at any point in its circumference.

The meridian cross-section of ring 22 is uniform over its entire circumference. It therefore has symmetry of revolution about axis A.

In FIG. 2, groove 24 is formed between two rings 28 and 30. Ring 28 is hooped onto ring 30, which is itself hooped onto piston 2.

Groove 24 is bounded axially by two contact surfaces with ring 22: a high pressure side surface 32 provided on ring 28, and a low pressure side surface 34 provided on ring 30. Each of surfaces 32 and 34 is of planar general shape, and extends in a plane perpendicular to axis A.

Ring 22 comprises a high pressure side surface 36 exposed to the pressure in volume 6 and a low pressure side surface 38 exposed to the pressure of volume 8. Each of surfaces 36 and 38 is of planar general shape, and extends in a plane perpendicular to axis A.

Surfaces 36 and 38 face respectively surfaces 32 and 34 in order to contact with surfaces 32 and 34.

The axial distance H between surfaces 32 and 34 is substantially equal to but greater than the axial distance between surfaces 36 and 38 so that distance H is just sufficient to allow radial movement of ring 22 within groove 24 while preventing any axial deformation of ring 22. In other words ring 22 is axially fitted in groove 24.

Radially groove 24 is sufficiently deep to allow ring 22 to move back and forth radially in groove 24.

An annular seal 40 of elastomer material is located between the base 42 of groove 24, extending axially between surfaces 32 and 34, and a surface 44 of ring 22 located opposite it. Seal 40 bears against surface 34.

Figure 5:
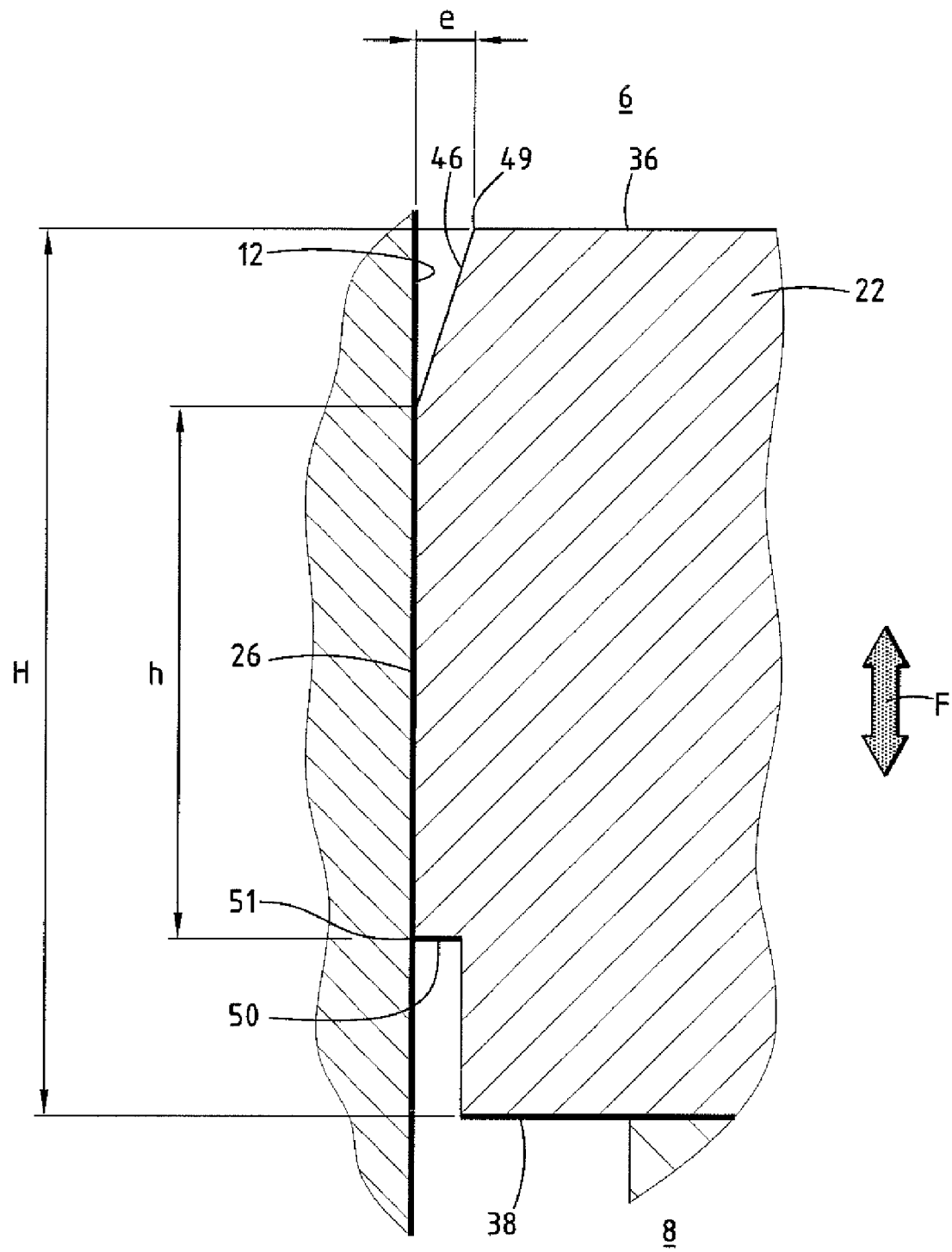
FIG. 5 is a detail view of that in FIG. 2, and FIGS. 6 to 9 are views similar to that in FIG. 2 illustrating variants of the sealing devices according to the invention.

As illustrated in FIG. 5, bearing surface 26 is extended on the side of volume 6 by a frustoconical section 46 of axis A which departs progressively further from surface 12 and joins surface 36 forming a sharp edge 49 bounding section 46 of the side of volume 6. The radial distance e between edge 49 and surface 12, in other words the radial distance between bearing surface 26 and edge 49, is of the order of a fraction of a micrometer.

Bearing surface 26 is bounded on the side of volume 8 by a sharp edge 51 on the low pressure side formed together with a scraping surface 50 joining bearing surface 28 forming an angle θ of from 45 to 90° (90° in FIG. 5) with axis A.

Surface 50 is axially offset with respect to surface 38 and joins the latter through cylindrical surface 52 of axis A.

In order to ensure that bearing surface 28 bears on surface 12 in a balanced way, bearing surface 26 is substantially centred on the equatorial median plane of ring 22 located halfway between surfaces 36 and 38, and the axial dimension of surface 46 is equal to the axial distance between surface 50 and surface 38.

Ring 22 bears tightly on surface 12. For this purpose, in free state, the perimeter of bearing surface 26 is greater than the perimeter of surface 12. Ring 22 is therefore resiliently deformed under compression when it is forced into surface 12.

Ring 22 has a small meridian cross-section so that ring 22 is very flexible and readily matches the geometry of surface 12, including where there are variations in the dimensions of surface 12 due to variations in temperature or pressure within chamber 4.

As ring 22 is closed and of uniform cross-section, it maintains a specific contact pressure between bearing surface 26 and surface 12 which is substantially uniform over the circumference of ring 22.

Ring 22 is dimensioned to work within its elastic limit, and within its fatigue limits.

The axial height h of bearing surface 6 is preferably from 0.5 to 5 mm. By this means the friction between bearing surface 26 and surface 12, which is proportional to this height h, can be limited, and the area of bearing surface 26 can be limited in such a way as to retain a significant specific contact pressure between bearing surface 26 and surface 12 despite the flexibility of ring 22.

In order to obtain a flexible ring 22 which does not buckle, radial thickness E is preferably from 1% to 5%, preferably from 2% to 5%, more preferably from 2% to 3% of the diameter D of surface 12.

Furthermore, preferably, the ratio of the difference between the perimeter of bearing surface 26 of ring 22 in the free state and the perimeter of surface 12 to the perimeter of surface 12 is from 1/1000 to 4/1000 in order to remain within the range of elastic deformation, depending upon the value of Young's modulus of the material forming ring 22.

Furthermore, preferably, the ratio of height h to the diameter of surface 12 is from 2/1000 to 3/100, notably from 1/100 to 3/100.

In one embodiment, diameter D is substantially equal to 75 mm, thickness E is equal to 1.5 mm and height H is substantially 1 mm.

The axial fit of ring 22 in groove 24 prevents any axial deformation of ring 22 which might give rise to leaks between ring 22 and groove 24, and a non-uniform pressure of bearing surface 26 on surface 12.

Returning to FIG. 1, jacket 20 comprises a central section 54 integral with skirt 18, prolonged at each of its axial extremities by a bearing shoe 56 of diameter greater than that of section 54 and spaced away from skirt 18 and connected to section 54 by a resilient frustoconical linking portion 58.

Each shoe 56 is closed, that is to say it is circumferentially continuous, for improved guidance.

Together with surface 12 piston 2 bounds an annular space 60 axially closed by lower shoe 56 located at the side of volume 8 and ring 22.

Shoes 56 have the function of radially guiding piston 2 along surface 12, and not a sealing function. Nevertheless, shoes 56 are guided by surface 12 with as little radial play as possible, thus ensuring that they bear against a hydrodynamic oil film.

Figure 4:
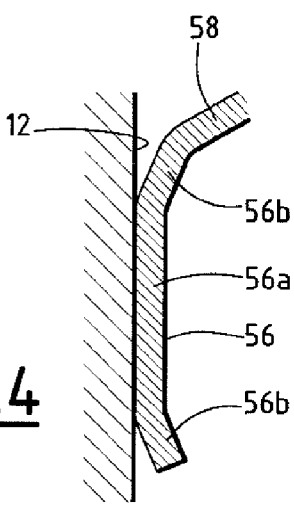
FIG. 4 is an enlarged view of area IV in FIG. 1.

Each shoe 56 is designed to form a hydrodynamic oil film between shoe 56 and surface 12. For this purpose, as shown in FIG. 4, each shoe 56 has a profile comprising a central cylindrical section 56*a*, and at each extremity of section 56*a* a frustoconical section 56*b* separating from surface 12 at an angle of approximately 2° in order to define together with the latter a tapering oil entry between section 56*a* and surface 12.

Upper shoe 56 located alongside volume 6 divides space 60 into a lower subspace 61 bounded together with lower shoe 56 and an upper subspace 62 bounded together with ring 22 communicating with subspace 61 through openings 63 made in upper portion 58.

A fresh oil feed nozzle 64 fed in a known way from the engine's crankcase is aimed in such a way as to continuously deliver a jet of fresh oil into a duct 66 provided in skirt 18 and having an opening opposite tube 64 and an outlet opening into subspace 61.

Piston 2 has a void 68 which cools body 14, feeding into space 62, and emptying via a drainage duct 70 into volume 8.

When in operation the fresh oil delivered by nozzle 64 reaches space 70 where it forms a reserve of oil which cools surface 12, feeds the limit lubricating film between ring 22 and surface 12 and the hydrodynamic lubricating oil film between surface 12 and each of shoes 56.

The hydrodynamic film fills the radial space between shoes 56 and the sliding surface, a space approximately 2/10,000 of the diameter D of surface 12.

The oil empties into subspace 61, and flows into subspace 62 through openings 63 so as to feed the limit lubricating oil film between ring 22 and surface 12. Subspace 62 makes it possible for oil to be fed over the entire circumference of the low pressure edge of bearing surface 26 comprising edge 51.

The oil feed to ring 22 is substantially permanent and continuous, given that subspace 61, fed intermittently as a result of the movement of piston 2 in relation to nozzle 64, forms a buffer reserve feeding subspace 62 through a shaker effect.

The oil flows from space 62 into void 68, so as to cool body 14, and then returns to volume 8 via duct 70.

The reserve oil in space 60 moves with piston 2 and cools surface 12. Advantageously surface 12 is only cooled by that oil, without external water cooling, which simplifies the engine and reduces its manufacturing cost.

With reference to FIG. 5, when ring 22 moves from volume 6 towards volume 8, surface 50 scrapes off the layer of oil located in space 62 on surface 12 in such a way as to determine the thickness of the limit lubricating film deposited on the part of surface 12 located within volume 6.

The limit lubricating film covers the part of surface 12 located in volume 6 between the present position of edge 51 and the position of the latter at the top dead centre point for the piston at all times.

The limit lubricating film has a thickness of a fraction of a micrometer, that is less than 1 μm, preferably from 0.1 μm or 0.2 μm to 1 μm, and even more preferably from 0.1 μm to 0.5 μm.

Such an oil film thickness is less than the thickness of a hydrodynamic film, which is generally from 5 to 10 micrometers.

In hydrodynamic lubrication the film comprises several layers of molecules sliding over each other, whereas in limit lubrication the film substantially comprises a single layer of molecules held on the sliding surface by physical and chemical forces and permitting sliding contact between the surfaces between which the limit lubricating film is formed.

The limit lubricating film is sufficient to ensure that bearing surface 26 slides over surface 12 with limited friction, while ensuring an effective seal, preventing the passage of gas between bearing surface 26 and surface 12.

Edge 51 associated with the high bearing pressure prevents the appearance of a hydrodynamic film between bearing surface 26 and surface 12.

The thickness of the limit lubricating film depends on the specific contact pressure between bearing surface 26 and surface 12. Preferably this pressure is from 20 to 100 bars in order to determine the size of the limit lubricating film.

The contact pressure is the sum of a "resilient" pressure resulting from the tightening of ring 22 against surface 12, and a pressure due to the gas in volume 6. In fact, with reference to FIG. 2, the mounting of ring 22 is of the self-sealing type because the gases can penetrate groove 24. Thus ring 22 is axially forced by the gases in volume 6 into bearing against surface 34 in a leak tight manner and radially against surface 12 by the gases in volume 6 present in groove 24.

Radial back and forth movement between ring 22 and groove 24 makes it possible to absorb the differential expansion between piston 2 and surface 12, or radial movements of piston 2 with respect to surface 12, for example when piston 2 reverses direction at top dead centre or bottom dead centre.

When ring 22 moves from volume 8 to volume 6, the distance e is sufficiently small to prevent the passage of abrasive particles between surface 12 and bearing surface 26. Such particles are pushed back by surface 36 which then forms a scraping surface.

The improved seal provided by ring 22 means that only a single ring to provide a seal and scrape oil needs to be provided between piston 2 and surface 12, which is advantageous, especially in internal combustion engines, in which the sealing devices generally comprise three sealing rings.

Figure 6:
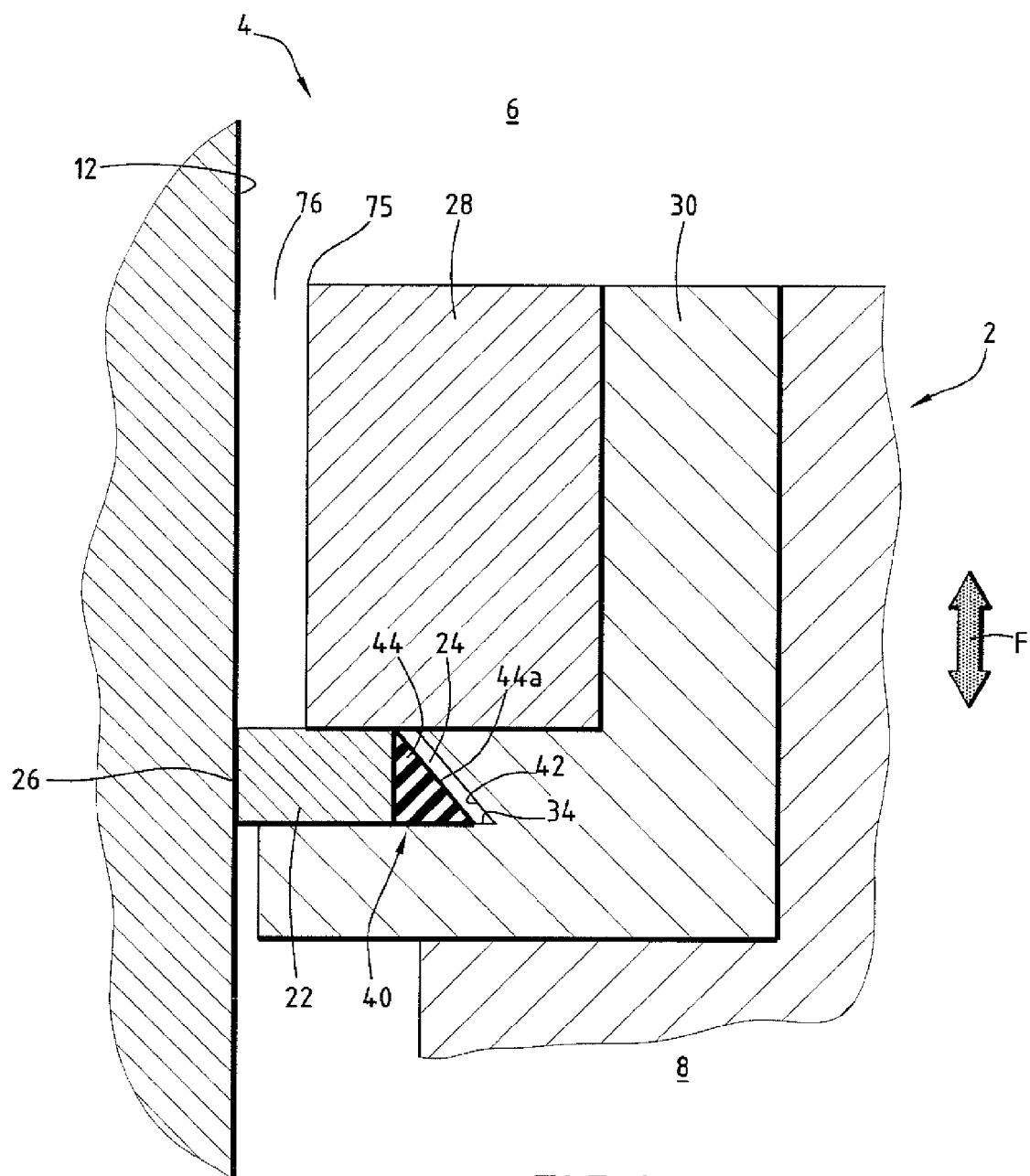

In the variant in FIG. 6 device 10 differs from the previous variant in the shape of seal 40, which is of triangular cross-section, and is located in the angle between surface 44 and surface 34. Because of the self-sealing mounting of ring 22, seal 40 is pressed against surfaces 44 and 34 by the gases in volume 6, which ensures a good seal.

Advantageously seal 40 is adhesive bonded onto surface 44 of ring 22 in order to be integral therewith.

Joint 40 ends at a radial distance from the base 42 of groove 24 so as not to obstruct back and forth radial movement of ring 22 in groove 24.

In order to limit the free volume in groove 24, base 42 is inclined substantially parallel to a rear surface 44*a* of seal 44.

Figure 7:
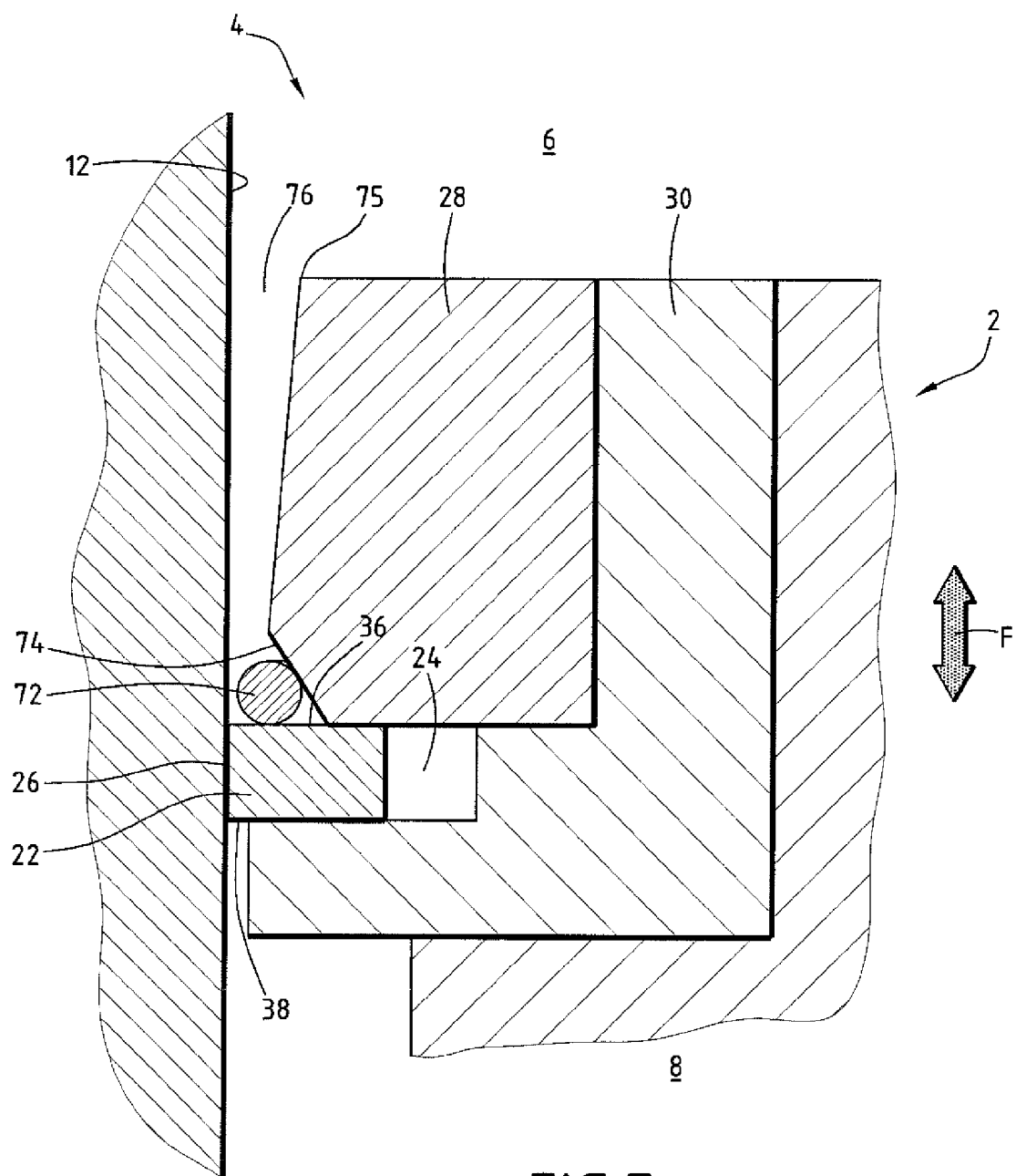

In the variant in FIG. 7 device 10 differs from the preceding variants in that ring 22 is mounted in a non-self-sealing fashion and the seal between ring 22 and groove 24 is provided by metal contacts without the use of elastomer materials.

Device 10 comprises a metal auxiliary sealing ring 72 located axially between surface 36 and a frustoconical surface 74 of ring 28 having an axis A, extending towards volume 6.

Ring 72 is pressed against surface 36 of ring 22 by being tightened resiliently against tapering surface 74. As a result ring 72 is held in tension, and bears in a leak tight contact against surface 74 and surface 36, forming a self-sealing static seal with groove 24, which can be fed with pressurised oil coming from volume 8.

In this case the specific contact pressure between bearing surface 26 and surface 12 depends only on the resilient pressure.

Ring 72 is in contact with ring 22 in the plane perpendicular to axis A, located in the plane of or on the low pressure side of an edge of bearing surface 26 located adjacent to high pressure volume 6 in order to prevent an anti-self-sealing function in ring 22.

In all the variants the volume of an annular space 76 bounded between piston 2 and surface 12 and axially between ring 22 and axial extremity 75 of piston 2 located alongside volume 6 is preferably sufficiently large for the mass of gas filling this space 76 at the minimum pressure reached in volume 6 during the cycle to have a sufficiently large volume to immerse ring 22 on the side exposed to volume 6 when this mass of gas is compressed to the maximum pressure reached in volume 6 during the cycle.

Thus, as a result of the satisfactory seal provided by the device, this mass of gas is trapped in that space 76 during the cycle of piston 2 and is not renewed. It follows that this mass of gas, which is alternately compressed and decompressed in contact with surface 12 with which heat is exchanged as a result of the high speed of piston 2, after a certain time reaches a mean temperature close to that of surface 12 which is very much lower than the mean temperature of the gases present in volume 6.

This relatively cold mass of gas feeds the limit gas layer which covers the oil film deposited on surface 12 in each travel of piston 2 towards volume 8, limiting the flow of heat towards surface 12.

In the variants illustrated in FIGS. 1 to 7, surface 12 is integral with chamber 4, and groove 24 is integral with piston 22.

Figure 8:
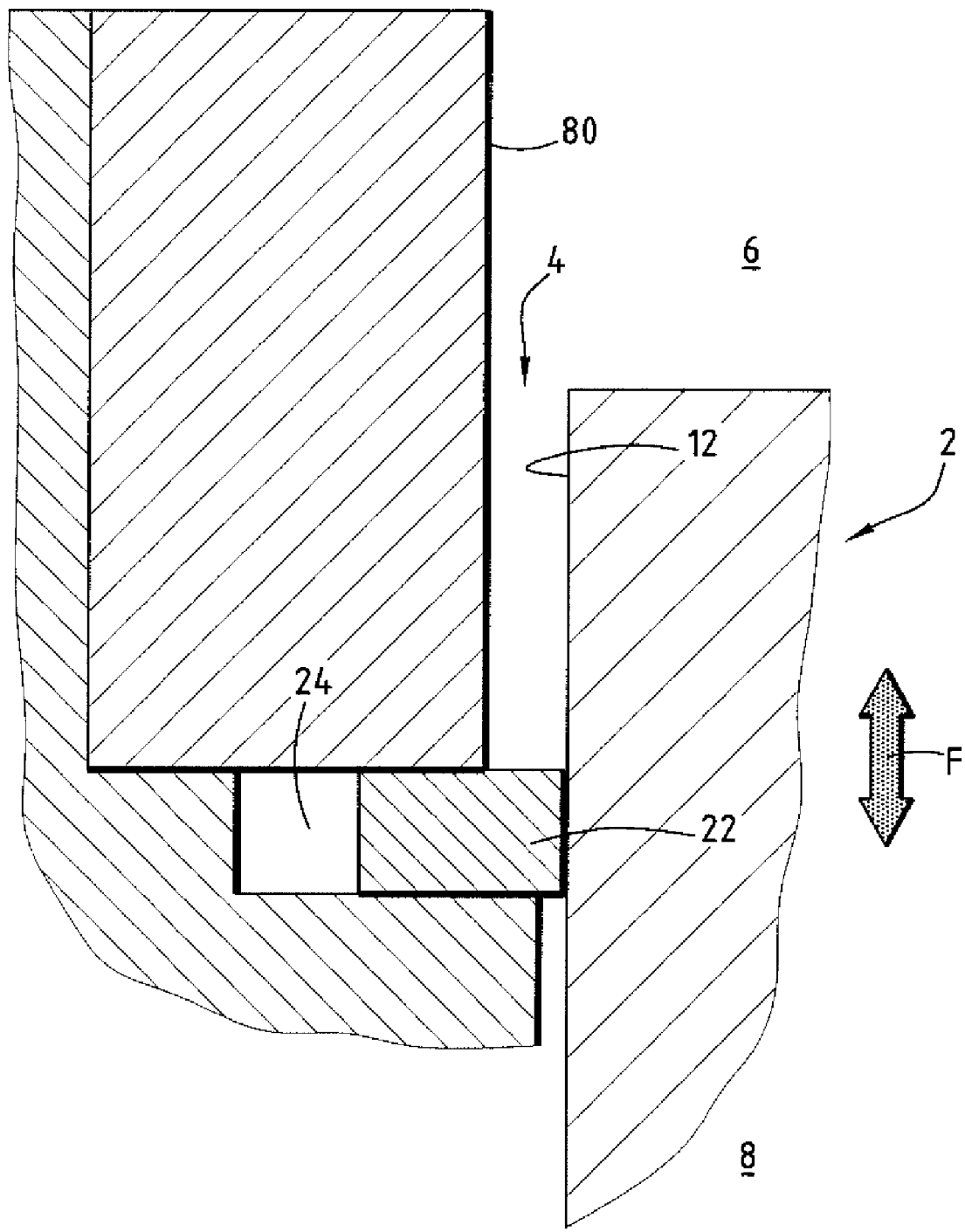

In a variant illustrated in FIG. 8, surface 12 is provided on piston 2 and ring 22 is housed in a groove 24 provided in a wall 80 of chamber 4 in such a way that ring 22 is received in a leak tight fashion against wall 80 and provides a seal for piston 2 when in movement.

In this case ring 22 is pressed against the sliding surface and deforms elastically under tension. Ring 22 runs no risk of buckling.

In all the variants, the radial force pressing the ring against sliding surface 12 is proportional to the area of the sealing bearing surface 26 and the contact pressure between surface 12 and bearing surface 26.

In a self-sealing arrangement (FIGS. 1 to 6) the contact pressure is the sum of the resilient pressure resulting from tightening ring 22 against surface 12 and the pressure of the gases in volume 6 (and possibly the pressure due to radial deformation of an annular seal placed between the ring and the base of the groove).

In an alternating internal combustion engine or alternating compressor volume 6 is filled with gas at a pressure which ranges from a maximum pressure Pmax corresponding to top dead centre for piston 2 to a minimum pressure Pmin corresponding to bottom dead centre for piston 2.

At bottom dead centre the contact pressure is substantially equal to the resilient pressure and should be sufficient to determine the size of the oil film. The resilient pressure preferably lies from 20 to 100 bars.

At top dead centre the contact pressure should not be excessive. In a Diesel engine, with a resilient pressure of from 20 to 100 bars, the contact pressure at top dead centre will be typically of the order of 200 to 280 bars.

Furthermore, because the contact pressure varies between top dead centre and bottom dead centre the thickness of the limit lubricating film will vary over the sliding surface. The thickness of the limit lubricating film increases from volume 6 towards volume 8.

In a non-self-sealing assembly (FIG. 7) the contact pressure is substantially constant and equal to the resilient pressure, because it does not depend on the pressure of the gases in volume 6.

Thus a non-self-sealing assembly encourages a reduction in friction losses and uniformity of the thickness of the limit lubricating film.

Figure 9:
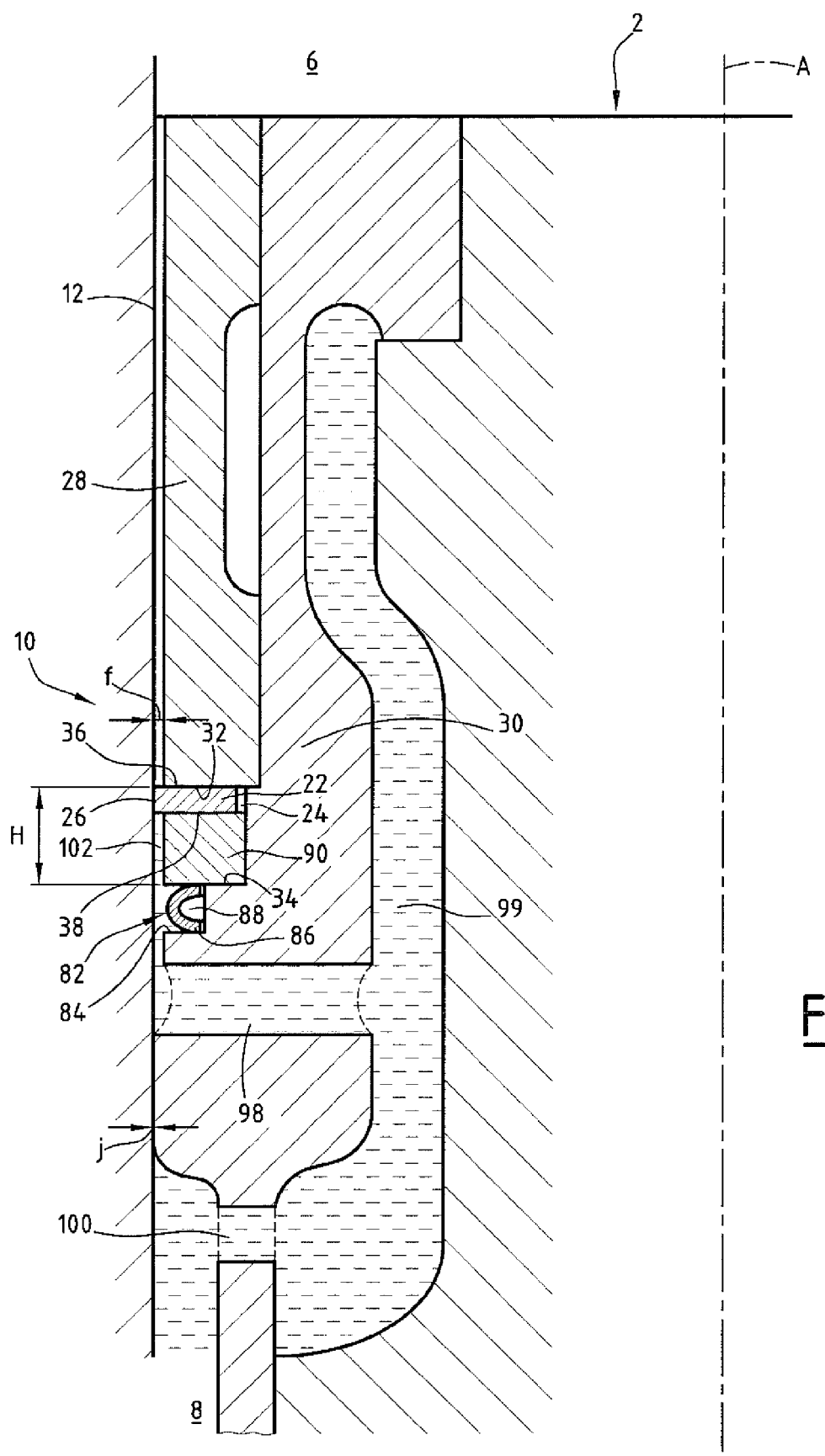

FIG. 9 illustrates another embodiment of a non-self-sealing assembly of ring 22.

The embodiment in FIG. 9, in which the references to elements similar to those in FIGS. 1 to 7 have been retained, differs from that in FIG. 2 in that it comprises resilient means 82 forming an axial spring located between a radial bearing surface 84 of piston 2 and surface 38 of ring 22 in such a way as to stress ring 22 axially so that its surface 36 bears against surface 32.

As previously, ring 22 is still designed to determine the size of a limit lubricating film between its bearing surface 26 and sliding surface 12. Thus the radial thickness of ring 22 is chosen in relation to the material comprising ring 22 so as to obtain a sufficient resilient pressure, preferably from 20 to 100 bars.

In this assembly an intimate contact will be established between surfaces 32 and 36 to ensure a gastight seal between surfaces 32 and 36.

The resilient means are for example provided in the form of an axially resilient ring 86 having a C-shaped cross-section which is radially open towards the interior, with one limb bearing against surface 84 and one limb bearing against ring 22.

Surface 84 is for example a radial surface of peripheral annular space 88 provided in surface 34 of groove 24.

In order that ring 22, as illustrated in FIG. 9, can be satisfactorily applied to surface 32 in a state of high stress sealing device 10 has an annular wedge 90 placed between resilient means 82 and ring 22. Groove 24 has an axial dimension H between its surfaces 32 and 34 which is greater than the overall axial dimension of ring 22 and wedge 90 is placed between surface 34 and ring 22 in such a way that the assembly of wedge 90 and ring 22 is substantially fitted within groove 24.

Wedge 90 is for example of rectangular or square cross-section.

Wedge 90 makes it possible to distribute the forces of resilient means 82 more uniformly over ring 22 to ensure good planar contact between ring 22 and surface 32, ensuring a better seal.

Preferably the axial seal force of resilient means 82 is sufficient to hold ring 22 against surface 32 over the entire pressure range in volume 6, while allowing ring 22 to move back and forth radially.

In order to limit the force exerted by the gases in volume 6 and ring 22 it is desirable that the radial play between surface 12 and ring 28 close to ring 22 be limited. This play is for example of the order of some hundredths of a millimeter.

In order to limit the axial displacement of ring 22 to a minimum in the situation where the force exerted by the gases in volume 6 is greater than the axial prestress exerted by resilient means 82 on ring 22, the play between surfaces 32 and 34 of the groove and between the assembly of ring 22 and wedge 90 is of the order of 0.01 mm.

If the force exerted by the gases in volume 6 is greater than the axial prestress exerted by resilient means 82 on ring 22 the gases will get behind ring 22 which will provide a self-sealing seal.

The embodiment in FIG. 9 therefore has advantages over the non-self-sealing arrangement with the security of the self-sealing function in the case where excess pressure in volume 6 overcomes resilient means 82.

Advantageously, in order to evacuate the oil accumulating on surface 36 of ring 22 under heavy engine loads, resilient means 82 are gauged so that ring 22 moves away from surface 36 when the gas pressure in the volume 6 approaches its maximum value Pmax. Thus the non-self-sealing seal momentarily changes into self-sealing mode, and oil which has accumulated above ring 22 is driven behind the latter.

It should however be noted in this respect that the fact that the film thickness is the same over the entire travel of ring 22 in non-self-sealing mode prevents a greater thickness of lubricating film on the side of volume 8 and limits the quantity of oil rising from the bottom of surface 12 in comparison with self-sealing mode.

In any event it is preferable that the resilient pressure should be increased to prevent oil from rising up at the expense of an increase in friction. Polishing of surface 12 and bearing surface 26 can reduce friction.

In the embodiment in FIG. 2, ring 22 is provided with a bevel 46 to prevent the oil film from being scraped when ring 22 moves in the direction of volume 6.

In the embodiment in FIG. 9 it is impossible to provide a bevel without becoming anti-self-sealing, so the upper boundary of bearing surface 26 is located in the plane of surface 32. This prevents gas pressure from reducing the contact pressure on bearing surface 26.

Skirt 18 of piston 2 is preferably guided by a shoe 56, located alongside volume 8 in relation to ring 22, having a play j with surface 12 which is less than the amount f by which ring 22 projects in relation to surface 32, and shoe 56 is designed to determine the size of a hydrodynamic film between shoe 56 and surface 12 which is fed with oil from openings 98.

This very small play j makes it necessary that shoe 56 be mechanically and thermally decoupled from the massive part of piston 2 defining the combustion chamber. In order to achieve this piston 2 for example comprises, as illustrated in FIG. 9, an annular cavity 99 bounded radially between shoe 56 and the massive part of piston 2, cavity 99 being fed with oil from the crankcase of the engine through openings 100.

Cavity 100 communicates with space 102 between shoe 56 and ring 22 to feed the oil film through the openings 98 provided in ring 30.

In operation all the empty spaces between ring 22 and shoe 56 are permanently fed with oil.

In all the embodiments, in order to limit losses due to friction it is preferable to limit the height h of bearing surface 26. Furthermore, height h must be sufficient to provide a seal, and ensure that the pressure of the gases in volume 6 does not drive the lubricating film between bearing surface 26 and surface 12 during the time when that applies. This depends on the film thickness and the roughness of the surfaces in contact (bearing surface 26 and surface 12). If a height h of 1000 times the film thickness is considered to be sufficient, a height h of from 0.2 to 1 millimeter is sufficient for a film of from 0.2 to 1 µm.

In one embodiment height h is 0.5 mm, diameter D of surface 12 is 80 mm and a resilient pressure of 80 bars is sufficient to ensure a seal. In this case the radial thickness of steel ring 22 is substantially 1.5 mm in order to achieve the required resilient pressure. The cross-section of ring 22 is therefore a rectangle of height 0.5 mm and width 1.5 mm.

In the embodiment in FIG. 9, wedge 90 has for example a square cross-section with sides of 1.4 mm.

More generally, the invention relates to a sealing device for a piston which is designed to move in alternating linear motion parallel to a direction in a chamber divided by the piston into high pressure volume and a low pressure volume, of the type comprising:

a circular cylindrical sliding surface having an axis parallel to the direction of linear movement of the piston, an annular groove coaxial with the sliding surface, opening towards the sliding surface, one of the sliding surface and the groove being integral with the piston and the other with the chamber, a resilient closed sealing ring housed in the groove in a leak tight fashion and in sealing contact with the sliding surface through a sealing bearing surface, the ring being resiliently pressed onto the sliding surface, in which the ring is designed to maintain a lubricant film having a limit lubricating thickness of less than one micrometer on the sliding surface.

What is claimed is:

1. A sealing device for a piston for an alternating internal combustion engine or alternating compressor, designed to move in alternating linear movement parallel to an axis of a circular cylindrical sliding surface of a chamber divided by the piston into a high pressure volume and a low pressure volume, the sealing device comprising:

a sliding surface partly bounding the chamber, and defining a perimeter, an annular groove provided in the piston which is coaxial with the sliding surface and opened towards the sliding surface, a closed resilient metallic sealing ring having a uniform cross section and a sealing bearing surface, the ring being housed within the groove in leak tight fashion, and being in sealing contact with the sliding surface, through said sealing bearing surface, said sealing bearing surface having a perimeter, said perimeter of said sealing bearing surface in the free state being slightly greater than the perimeter of the sliding surface so that the sliding surface imparts permanent resilient compression deformation on the ring which brings about a substantially uniform bearing pressure between the bearing surface and the sliding surface when the ring is resiliently held tightly against the latter, and a lubricating oil film between the ring and the sliding surface which is sized by the ring to a limit lubricating thickness of 0.1 µm to 1 µm when the ring moves from the high pressure volume to the low pressure volume.

2. A device according to claim 1, wherein said sealing bearing surface of said resilient sealing ring has an edge located on the side of the low pressure volume, said edge having a periphery, and wherein the device includes means to deliver lubricating oil to the entire said periphery of said edge of the bearing surface of the ring.

3. A device according to claim 1, wherein the ring is fitted in the groove in such a way as to prevent axial deformation of the ring, and to allow the ring to move radially within the groove.

4. A device according to claim 3, wherein said annular groove includes axial boundaries constituted by two surfaces of planar general shape in contact with said ring, perpendicular to the axis of the sliding surface, the axial distance between the two contact surfaces being just sufficient to prevent axial deformation of the ring, and to allow the ring to move radially within the groove.

5. A device according to claim 1, wherein the radial thickness of the ring is from 1% to 5% of the diameter of the sliding surface.

6. A device according to claim 1, wherein the ratio of the difference between the perimeter of the bearing surface and the ring in the free state and the perimeter of the sliding surface to the perimeter of the sliding surface lies in the range from 1/1000 to 4/1000 of the said perimeter.

7. A device according to claim 1, wherein said bearing surface of said ring is cylindrical and has an axial dimension.

8. A device according to claim 7, wherein said axial dimension of said bearing surface of said ring is in the range from 0.2 to 5 mm.

9. A device according to claim 7, wherein said axial dimension of said bearing surface of said ring is in the range from 0.5 to 5 mm.

10. A device according to claim 7, wherein the ratio of said axial dimension of said bearing surface of said ring to the diameter of the sliding surface lies from 1/100 to 3/100.

11. A device according to claim 7, wherein the ratio of said axial dimension of the bearing surface of the ring to the diameter of the sliding surface lies from 2/1000 to 1/100.

12. A device according to claim 1, wherein said ring has a scraping surface for scraping the oil film covering the part of the sliding surface located in the low pressure volume, said surface joining said bearing surface of said ring forming a sharp edge on the low pressure side bounding said bearing surface on the side of the low pressure volume.

13. A device according to claim 12, wherein said scraping surface joins said bearing surface at an angle on the low pressure side in the range from 45 to 90° to the said axis in such a way as to leave a limit lubricating oil film of a thickness having a fraction of a micrometer on the part of the sliding surface located within the high pressure volume.

14. A device according to claim 1, wherein said bearing surface of said ring is extended on the high pressure volume side by a section which separates progressively from the sliding surface as far as a sharp edge on the high pressure side bounding the section on the high pressure volume side formed with a surface of said ring, the said sharp edge being at a distance of a fraction of a micrometer from the sliding surface.

15. A device according to claim 1, wherein the sliding surface is polished to cause any relief greater than the thickness of the limit lubricating oil film to disappear.

16. A piston according to claim 1, wherein said ring has one surface of planar general shape perpendicular to the axis of the sliding surface in contact with a surface of planar general shape defining the side of the groove located on the side of the low pressure volume.

17. A device according to claim 16, wherein the device includes an annular seal of elastomer material in permanent contact with a base surface defining the base of the groove, with the surface of the ring facing the base of the groove and with one surface of planar general shape of the groove located on the side of the low pressure volume.

18. A device according to claim 16, wherein the device includes an annular seal of elastomer material integral with the ring which occupies the entire angle formed by the surface of the ring facing the base of the groove and the surface of planar general shape of the groove located on the side of the low pressure volume.

19. A device according to claim 16, wherein the device includes a resilient auxiliary ring kept in leak tight contact with a planar sealing surface of the sealing ring, perpendicular to the axis of the sliding surface located on the side of the high pressure volume because it is held tightly against a substantially tapering sealing surface defining a surface of the groove which is open towards the high pressure volume.

20. A device according to claim 19, wherein said auxiliary ring is in contact with said sealing ring in a plane which is intended to be perpendicular to the axis of the sliding surface located in the plane of or on the low pressure side of an edge of the bearing surface of the sealing ring located on the side of the high pressure volume.

21. A device according to claim 1, wherein the groove is bounded by a planar surface on the high pressure side perpendicular to axis, and the device includes resilient means to press the high pressure side surface of the ring axially against the high pressure side surface of the groove.

22. A device according to claim 21, wherein the device includes an annular wedge located between the resilient means and the ring.

23. A device according to claim 22, wherein an assembly formed by the ring and the wedge is fitted axially into the groove.

24. A device according to claim 5, wherein the radial thickness of the ring is from 2% to 5%.

25. A device according to claim 24, wherein the radial thickness of the ring is from 2% to 3%.

26. An assembly for an alternating internal combustion engine or alternating compressor comprising:
   at least one chamber having a circular cylindrical sliding surface,
   a piston designed to move in alternating linear movement parallel to the axis of the sliding surface dividing the chamber into a high pressure volume and a low pressure volume,
   a sealing device between the piston and the sliding surface, the sealing device including
   a sliding surface partly bounding the chamber, and defining a perimeter,
   an annular groove provided in the piston which is coaxial with the sliding surface and opened towards the sliding surface,
   a closed resilient metallic sealing ring having a uniform cross section and a sealing bearing surface, the ring being housed within the groove in leak tight fashion, and being in sealing contact with the sliding surface, through said sealing bearing surface, said sealing bearing surface having a perimeter, said perimeter of said sealing bearing surface in the free state being slightly greater than the perimeter of the sliding surface so that the sliding surface imparts permanent resilient compression deformation on the ring which brings about a substantially uniform bearing pressure between the bearing surface and the sliding surface when the ring is resiliently held tightly against the latter, and
   a lubricating oil film between the ring and the sliding surface which is sized by the ring to a limit lubricating thickness of 0.1 μm to 1 μm when the ring moves from the high pressure volume to the low pressure volume.

27. An assembly according to claim 26, wherein an annular space is located radially between the piston and the sliding surface, and axially between the sealing ring and the axial extremity of the piston within the high pressure volume, the annular space having a sufficient volume for a mass of gas present in said space at a minimum pressure of the cycle in the high pressure volume to occupy a volume sufficient to wholly immerse the part of the sealing ring which is exposed to high pressure when the said mass of gas is compressed at the maximum pressure of the cycle within the high pressure volume.

28. An assembly according to claim 26, wherein the piston comprises at least one closed annular guide shoe bounding axially with the sealing ring and radially with the sliding surface a closed annular space communicating with a fresh oil feed and draining into a cooling circuit of the piston opening into the low pressure volume.

29. An assembly according to claim 27, wherein the piston comprises at least one closed annular guide shoe bounding axially with the sealing ring and radially with the sliding surface a closed annular space communicating with a fresh oil feed and draining into a cooling circuit of the piston opening into the low pressure volume.

30. An assembly according to claim 28, wherein the sliding surface is only cooled by a reserve of fresh oil carried by the piston in the space formed between the shoe and the sealing ring.

31. An assembly according to claim 29, wherein the sliding surface is only cooled by a reserve of fresh oil carried by the piston in the space formed between the shoe and the sealing ring.

* * * * *